Figure 1:
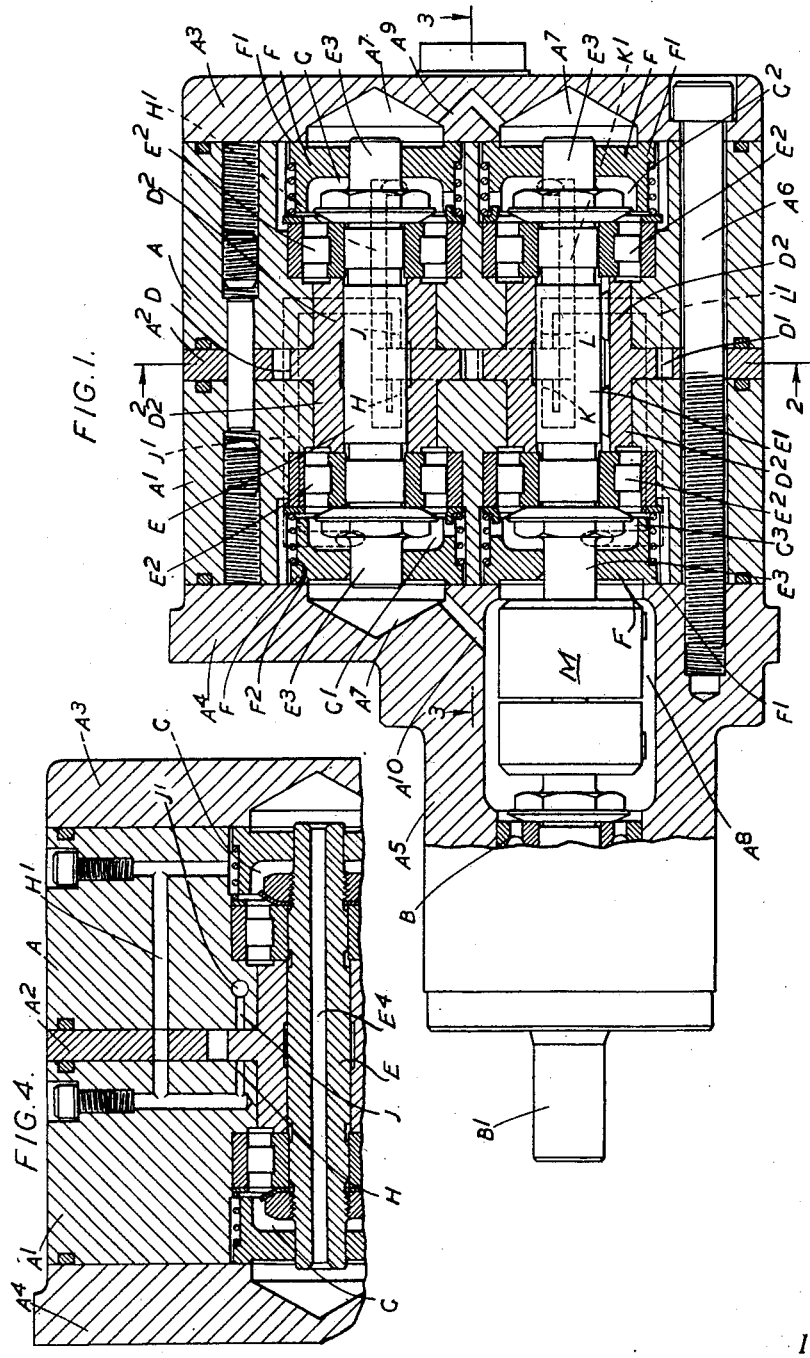

Feb. 28, 1950 G. E. CHITTENDEN 2,498,911
CONTROL OF END CLEARANCES OF ROTORS
Filed May 27, 1947 3 Sheets-Sheet 2

Inventor
George E. Chittenden
By
Emery, Holcombe & Blair
Attorney

Feb. 28, 1950    G. E. CHITTENDEN    2,498,911
CONTROL OF END CLEARANCES OF ROTORS
Filed May 27, 1947    3 Sheets-Sheet 3

Inventor
George E. Chittenden
By
Emery, Holcombe & Blair
Attorney

Patented Feb. 28, 1950

2,498,911

UNITED STATES PATENT OFFICE 2,498,911

CONTROL OF END CLEARANCES OF ROTORS

George Edward Chittenden, Warwickshire, England, assignor to The Keelavite Company Limited, Allesley, Coventry, Warwickshire, England, a company of Great Britain Application May 27, 1947, Serial No. 750,815
In Great Britain May 28, 1946

10 Claims. (Cl. 103—126)

This invention relates to the control of end clearances, i. e. the so called axial clearances, for rotors and is particularly but not exclusively applicable to the control and maintenance of the axial clearances or rotors which are arranged to act upon or be acted upon by or to control fluid under pressure, such for example as rotary valves or the rotors of rotary pumps or fluid motors, hereafter for convenience termed rotary fluid pressure machines, whether intended primarily to act as pumps or motors or constituting ports of fluid transmission apparatus, fluid meters or like apparatus.

The term axial clearance herein used is to be interpreted as including any clearance which will vary with relative axial movement between the rotor and its housing or working chamber and for convenience the term end face as applied to a rotor or its housing will thus be used to include not only substantially flat end faces but other faces, for example conical, convex or concave faces on the rotor and housing such that relative axial movement between the rotor and the housing in which it lies varies the clearance between the faces.

In apparatus including one or more rotors difficulty has been experienced in ensuring the maintenance of approximately correct axial clearance where this is important, either for example for the purpose of reducing or preventing wear, reducing leakage or maintaining good general efficiency. Thus in the common case of a rotor subect to fluid pressure within a working chamber any axial movement in one direction produces an increased axial clearance at one end into which the flow of fluid pressure is thus facilitated so that the initial increase tends to be maintained and increased. There is therefore a tendency for the rotor always to be maintained with maximum axial clearance at one end and minimum axial clearance at the other.

The use of locating thrust bearings has been proposed to hold the rotor in approximately the correct axial position but this involves increased manufacturing problems and difficulties in maintaining the location under varying thermal expansion, especially in high pressure machines where the desirable axial clearances may be of the order of 0.0007".

The object of the present invention is to provide an arrangement in which approximately correct axial clearances can be more readily achieved and maintained.

To this end according to the present invention, the combination of a rotor and casing includes means for controlling the clearance between at least one end of the rotor and the casing comprising a fluid pressure chamber part of the wall of which is constituted by a surface on the rotor the pressure on which tends to move the rotor axially, and fluid delivery and escape paths communicating with the fluid pressure chamber and respectively with points within the casing of high and low fluid pressure, at least one of these paths including a throttling point constituted by a clearance which varies with axial movement of the rotor relatively to the casing so as to control the flow therethrough in such a manner as to cause an increase in the pressure in the fluid pressure chamber when the rotor moves in the direction opposed to such pressure and vice versa.

In one arrangement according to the invention, the effective cross-sectional area of the escape path is substantially unaffected by axial movement of the rotor while the delivery path comprises a fluid pressure passage leading into the fluid pressure chamber from a point between adjacent surfaces on the rotor and casing to which flow of fluid under pressure takes place through a clearance which increases when the rotor moves against the action of the pressure in the pressure chamber.

Alternatively, the arrangement may be such that the effective cross-sectional area of the delivery path is substantially unaffected by axial movement of the rotor while the escape path includes a clearance between surfaces on the rotor and casing which decreases when the rotor moves axially against the action of the pressure in the pressure chamber and vice versa.

The invention is applicable to apparatus in which the function of the rotor is not to act upon or be acted upon by or to control fluid but the invention is particularly applicable to fluid pressure machines in which the rotors act upon or are acted upon by or control fluid under pressure whether such fluid pressure is used as the source from which fluid pressure is fed through the clearance and the fluid pressure passage to the fluid pressure chamber or not.

Thus in either case the fluid which flows through the clearance to or from the fluid pressure passage may be derived either from a source specially provided for the purpose or from some available source, for example from the pressure side of the fluid pressure machine or valve when the invention is applied to such a machine or valve or from a pressure type lubricating system.

When the invention is applied to a fluid pressure machine in which part of the surface of the rotor is exposed to the pressure in the high pressure part of the working chamber, and the variable clearance is in the delivery path, it conveniently forms in effect a restricted communicating passage between the high pressure part of the working chamber and the fluid pressure delivery passage. Thus in such an arrangement where, as is usual, the rotor is arranged within a working chamber with its ends adjacent to the ends of the chamber and a fluid operated thrust member, constituting in effect a piston coaxial with the rotor and disposed within a cylinder with which it forms a fluid pressure chamber, the fluid pressure passage conveniently extends between the fluid pressure chamber and a point in that clearance between an end face of the rotor and the adjacent end face of the working chamber which decreases with axial movement of the rotor under the action of pressure in the pressure chamber. Similarly when the invention is applied to a fluid pressure machine in which part of the surface of the rotor is exposed to a low pressure part of the working chamber and the variable clearance is in the escape path from the fluid pressure chamber, this variable clearance conveniently forms in effect a restricted communicating passage between the pressure chamber and the low pressure part of the working chamber, as for example by being constituted by the clearance between an end face of the rotor and the adjacent end face of the casing at a point adjacent to the low pressure part of the working chamber.

In any case it will generally be preferable to duplicate the arrangement so that the rotor carries or is formed with two similar fluid operated thrust members, the fluid pressure in the fluid pressure chambers of which tends to move the rotor respectively in opposite directions. Each fluid pressure chamber will then be connected by a fluid delivery or escape passage to a point in the clearance space between the appropriate end of the rotor and the adjacent end of the working chamber so that clearance at both ends of the rotor are automatically controlled.

Figure 2:
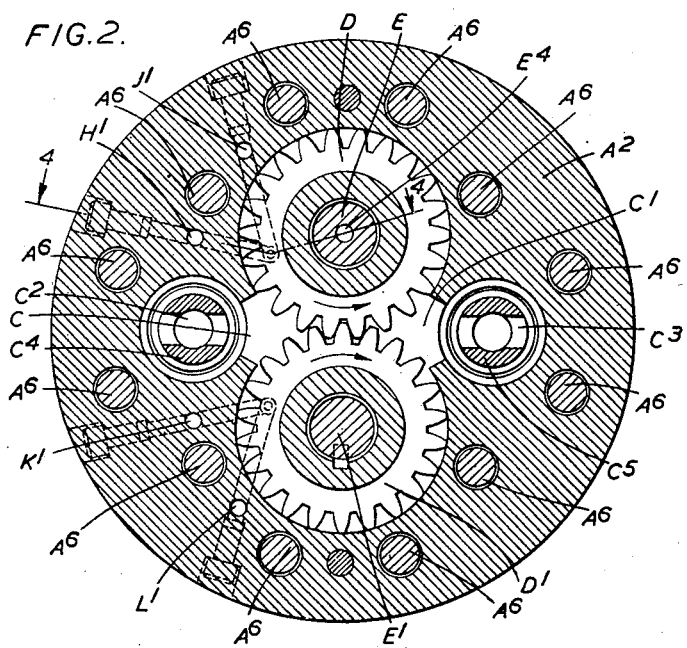
Figure 3:
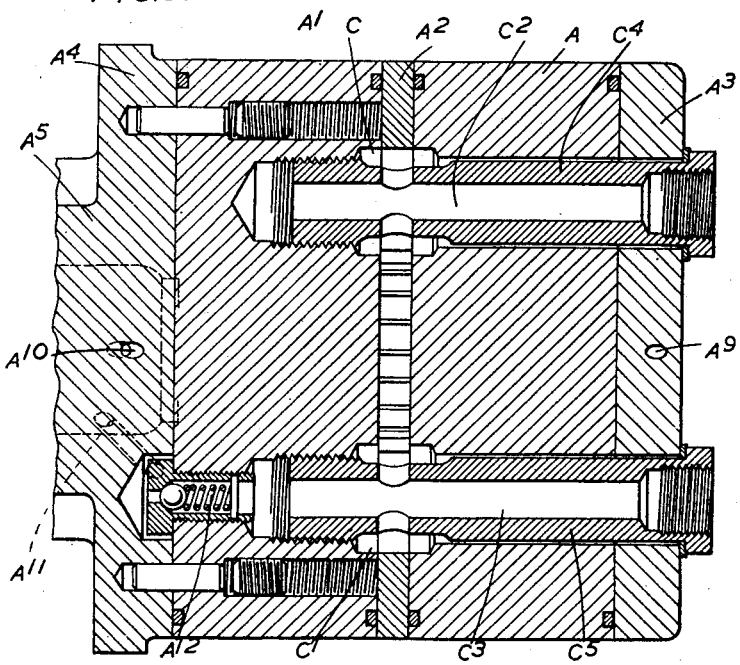
Figure 5:
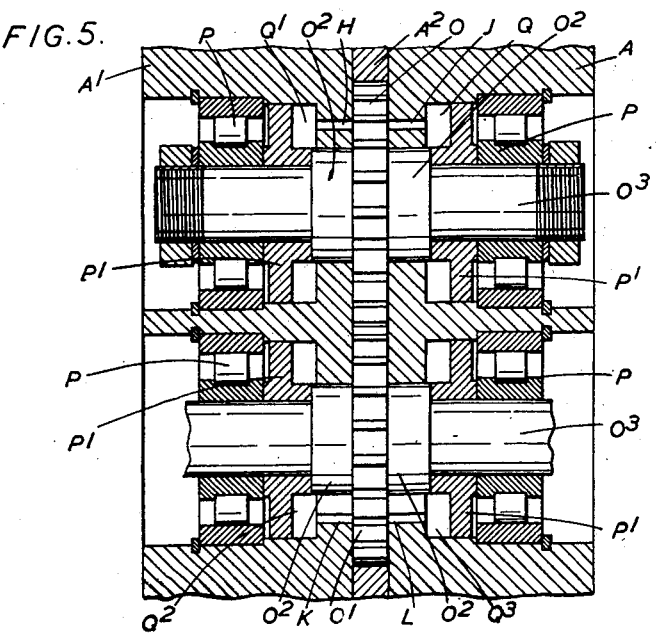
Figure 6:
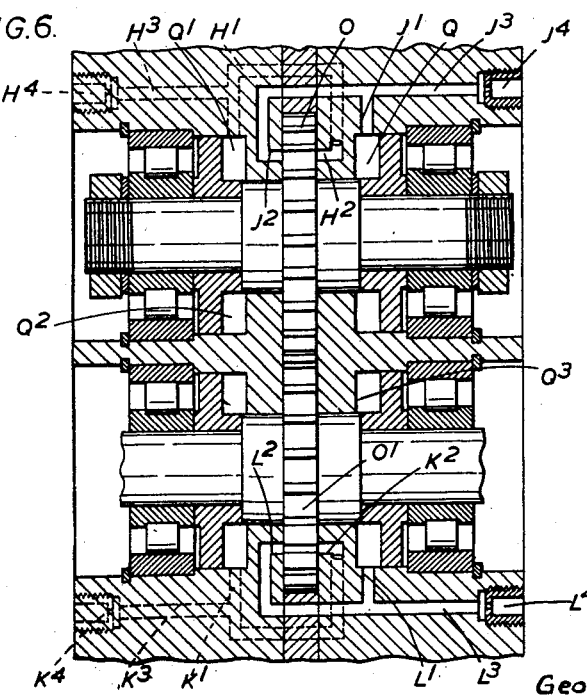

The invention may be carried into practice in various ways, but one construction according to the present invention as applied to a gear wheel pump, and two modifications thereof, are illustrated by way of example in the accompanying drawings in which, Figure 1 is a sectional side elevation of one construction in a plane containing the axes of the gear wheels constituting the rotors of the pump, Figure 2 is a section on the line 2—2 of Figure 1, Figure 3 is a section on the line 3—3 of Figure 1, Figure 4 is a section on the line 4—4 of Figure 2, Figure 5 is a somewhat diagrammatic view of a modified arrangement according to the invention, and Figure 6 is a similar view of Figure 5 of a further modification according to the invention.

In the construction illustrated in Figures 1 to 4 the pump comprises a casing built up from two similar body parts $A$, $A^1$ with a spacing plate $A^2$ between them and end walls $A^3$, $A^4$, of which $A^4$ is formed with a hollow boss $A^5$ in which is supported in bearings B a driving shaft $B^1$. The end walls $A^3$, $A^4$, the body parts $A$, $A^1$ and the plate $A^2$ are firmly clamped together by a series of through bolts $A^6$. The spacing plate $A^2$ and body parts $A$, $A^1$ are so formed as to provide between them the working chamber of the gear pump, the high and low pressure parts of which are indicated respectively by the reference letters C and $C^1$ in Figure 2 and communicate respectively with delivery and inlet passages $C^2$, $C^3$ in tubular members $C^4$, $C^5$ extending axially through the plate $A^2$, the body part A and the end wall $A^3$ as shown more particularly in Figures 2 and 3.

Mounted to rotate within the working chamber are the gear wheels D, $D^1$ which are formed integral with bosses $D^2$ lying with close clearance within bores in the body members A and $A^1$ as shown, so that the circumferential surfaces of these bosses $D^2$ and the bores in which they lie constitute substantial sealing areas between the working chamber of the pump and further bores formed in the outer portions of the body parts A, $A^1$ as hereinafter described.

The gear wheels D, $D^1$ are rigidly mounted, as by being keyed thereto, on supporting shafts E, $E^1$ which are carried adjacent to their ends in roller bearings $E^2$ in bores within the body parts A, $A^1$ and these shafts have end portions $E^3$ each of which is freely rotatable within but makes a close sealing fit with a plug-like sealing member F having an annular face $F^1$ which is pressed by a spring $F^2$ into close sealing engagement with the inner face of the adjacent end wall $A^3$ or $A^4$.

The working clearances between the ends $E^3$ of the shafts E and $E^1$ and the members F open into conical relief recesses $A^7$ and a relief chamber $A^8$, the two recesses $A^7$ in the wall $A^3$ communicating with one another through a passage $A^9$ while the two recesses at the opposite ends of the shaft E communicate with one another through the hollow bore $E^4$ of the shaft, and the recess $A^7$ in the end wall $A^4$ communicates with the recess $A^8$ through a passage $A^{10}$. Thus all three recesses $A^7$ communicate in effect with the chamber $A^8$.

It will be seen that with the construction above described substantially closed chambers G, $G^1$, $G^2$, $G^3$ are formed a part of the wall of each of which is constituted by the end face of the adjacent boss $D^2$. Thus any fluid pressure created in one of these chambers will act on the end face of the adjacent boss $D^2$ to apply an axial force to the gear wheel D or $D^1$ to which that boss is connected. The bosses $D^2$ can thus constitute fluid pressure operated thrust members by which axial forces can be applied to the gear wheels constituting the rotors of the pump by fluid pressure supplied to the chambers G, $G^1$, $G^2$, $G^3$.

Formed in the clearance spaces between the end faces of the gear wheel D and the adjacent end faces of the working chamber at points adjacent to the pressure side $C^2$ of this working chamber are ports H and J. The port H communicates through a passage $H^1$ with the chamber G while the port J communicates through a passage $J^1$ with the chamber $G^1$.

Similarly opening into the clearance spaces between the end faces of the gear wheels $D^1$ and the end walls of the working chamber adjacent to the pressure side $C^2$ of the working chamber are ports K and L, the port K communicating through a passage $K^1$ with the chamber $G^2$ while the port L communicates through a passage $L^1$ with the chamber $G^3$.

The chamber $A^8$ is conveniently connected to the low-pressure side of the working chamber through passage $A^{11}$ and a light spring controlled valve $A^{12}$ so as to tend to maintain a small pressure therein. The shaft $E^1$ is connected by a coupling M to the driving shaft $B^1$.

The operation of the apparatus is as follows:

The shaft $B^1$ is driven from a suitable source of power to rotate the gear wheels D, $D^1$ in the direction shown by the arrows in Figure 2, so that liquid is drawn through the passage $C^3$ into the suction chamber $C^1$ of the pump and delivered under pressure from the delivery chamber C through the delivery passage $C^2$. The pump is intended to operate at high delivery pressure with the result that, during operation, a small quantity of liquid is forced continuously from the delivery chamber C through the clearance between the end faces of the gear wheels D and $D^1$ to the ports H, J, K and L and from these ports respectively into the chambers G, $G^1$, $G^2$ and $G^3$, which are substantially closed, although a small continuous leakage can take place therefrom through the clearance between the parts F and $E^3$. Thus the ports H, J, K and L constitute fluid delivery paths to the chambers G, $G^1$, $G^2$ and $G^3$ having throttling points constituted by the clearances between the gear wheels D and $D^1$ and the adjacent end faces of the working chambers, while the clearances between the parts F and $E^3$ constitute fluid escape paths from these chambers. The arrangement is thus such that, the higher the rate of flow through any one of the ports H, J, K and L, the greater will be the pressure in the corresponding chamber G, $G^1$, $G^2$, or $G^3$, to which leads and if, any one of the ports H, J, K, or L is substantially closed the pressure in the corresponding chamber G, $G^1$, $G^2$ or $G^3$ will fall to substantially that in the recesses $A^7$, $A^8$.

Considering first the gear wheel D, if, during operation, of the pump this gear wheel tends to move to the left in Figure 1, thus reducing the clearances between its left hand end face and the adjacent end face of the working chamber the flow of liquid under pressure to the port H from the delivery chamber C will be reduced, thus reducing the pressure in the chamber G. At the same time the clearances between the right hand end face of the gear wheel and the adjacent face of the working chamber will be increased thus increasing the flow of liquid under pressure through the port J to the chamber $G^1$. The pressure in the chamber G will thus be reduced and that in the chamber $G^1$ increased with the result that, since these pressures act on the annular end faces of the bosses $D^2$, the gear wheel D will be forced in a direction tending to restore it to its original position. Similarly any axial movement of the gear wheel $D^1$ causes such variations in the pressures in the chambers $G^2$ and $G^3$ as to tend to restore the gear wheel to its original position. In practice, therefore, the arrangement tends to maintain both gear wheels in that axial position in which their end clearances are equal and to prevent either gear wheel being forced axially and maintained with a minimum clearance at one end face and maximum clearance at the other end face as tends to occur in gear wheel pumps not incorporating this invention.

Figure 5 shows somewhat diagrammatically, and as a development view, a modification of the arrangement shown in Figures 1 to 4 in which gear wheels O, $O^1$ are formed integral with bosses $O^2$ providing circumferential sealing surfaces with the casing parts A, $A^1$ and are rigidly secured to shafts $O^3$ supported in bearings P and having rigidly mounted thereon piston members $P^1$ disposed in short cylinders in the casing parts A so as to provide pressure chambers Q, $Q^1$, $Q^2$, $Q^3$ to which the ports J, H, K and L respectively lead. Thus, each of the ports H, J, K and L constitutes a fluid delivery passage to one of the chambers Q, $Q^1$, $Q^2$ and $Q^3$ having at its entrance a throttling point constituted by the clearance which varies with axial movement of the adjacent gear wheel while the working clearances between the piston members $P^1$ and their cylinders constitute fluid escape paths from these chambers. It will be seen that with this arrangement, any movement of the gear wheel O to the left in Figure 5 will increase the clearance space through which liquid pressure can flow to the port J and reduce the clear space through which liquid pressure can flow to the port H with the result that the pressure in the chamber Q is increased and that in the chamber $Q^1$ decreased. Thus the piston member $P^1$ in the chamber Q tends to move the gear wheel O to the right into its original position. Axial movement of the gear wheel $O^1$ has a similar effect on the pressures in the chambers $Q^2$ and $Q^3$ so that in practice the arrangement tends to ensure that each of the gear wheels O and $O^1$ will be maintained with substantially equal end clearances.

Figure 6 is a similar view to Figure 5 showing a modification of the arrangement shown in Figure 5 in which the chambers Q, $Q^1$, $Q^2$ and $Q^3$ are connected by ports $J^1$, $H^1$, $K^1$ and $L^1$ to outlet passages $J^2$, $H^2$, $K^2$ and $L^2$ constituting fluid escape paths terminating at points in the clearances between the end faces of the gear wheels O and $O^1$ and the casing adjacent to the low pressure part of the working chamber of the pump as shown. The chambers Q, $Q^1$, $Q^2$ and $Q^3$ also communicate through passages $J^3$, $H^3$, $K^3$ and $L^3$ containing metering orifices $J^4$, $H^4$, $K^4$ and $L^4$ with an appropriate source of fluid under high pressure, for example with the high pressure part of the working chamber.

Thus liquid is delivered continuously at a controlled rate through the metering orifices $J^4$, $H^4$, $K^4$ and $L^4$ to the chambers Q, $Q^1$, $Q^2$ and $Q^3$ and escapes therefrom continuously through the passages $J^2$, $H^2$, $K^2$ and $L^2$ at a rate which is varied by any variations in the end clearances in which these passages terminate. Thus it will be seen that if, for example, the gear wheel O tends to move to the left it will tend to open the passage $H^2$ and close the passage $J^2$. The rate of escape of fluid from the chamber $Q^1$ thus tends to increase while that from the chamber Q is reduced with the result that pressure increases in the chamber Q and decreases in the chamber $Q^1$ so as to return the gear to its original axial position. Thus each of the gear wheels O and $O^1$ tends always to be maintained in that axial position in which its end clearances are equal to one another.

What I claim as my invention and desire to secure by Letters Patent is:

1. The combination of a rotor having opposed end faces and a casing within which the rotor lies and rotates, axially opposed thrust members rigid with the rotor and each constituting part of the wall of axially spaced fluid pressure chambers the fluid pressure in which acting on said thrust members applies opposing axial forces to the rotor, each fluid pressure chamber having restricted communication through fluid delivery and escape paths respectively with points of high and low fluid pressure at the opposite faces of said rotor from said chambers respectively, at least one of these paths including a throttling point constituted by a clearance which varies with axial movement of the rotor relative to the casing so as to control the flow through such path in such a manner as to cause a relative pressure difference between the fluid pressure chambers opposing such movement of the rotor and thereby tend to equalize the clearance between the ends of the rotor and the casing.

2. The combination of a rotor and casing having means for controlling the clearance between the ends of the rotor and the casing as claimed in claim 1 in which the effective cross sectional area of the escape path is substantially unaffected by axial movement of the rotor while the delivery path comprises a fluid delivery passage leading into the fluid pressure chamber from a point between adjacent surfaces on the rotor and casing to which flow of fluid under pressure takes place through a clearance which increases when the rotor moves in the direction opposed to the pressure in the pressure chamber.

3. The combination of a rotor and casing including means for controlling the clearance between the ends of the rotor and casing as claimed in claim 1 in which the rotor constitutes part of a fluid pressure pump or motor and has a surface exposed to the pressure in the high pressure part of the working chamber, the clearance forming in effect a restricted communicating passage between the high pressure part of the working chamber and the fluid pressure delivery passage.

4. The combination of a rotor and casing including means for controlling the clearance between the ends of the rotor and the casing as claimed in claim 1 in which the effective cross sectional area of the delivery path is substantially unaffected by axial movement of the rotor while the escape path includes a clearance between surfaces on the rotor and the casing which decreases when the rotor moves axially against the action of the pressure in the pressure chamber and vice versa.

5. The combination of a rotor and casing including means for controlling the clearance between the ends of the rotor and the casing as claimed in claim 1 in which the rotor constitutes part of a fluid pressure pump or motor and has a surface which is exposed to the low pressure part of the working chamber, the clearance forming in effect a restricted communicating passage between the low pressure part of the working chamber and the pressure chamber.

6. A rotary fluid pressure machine comprising a rotor arranged within a working chamber with its ends adjacent to the ends of the working chamber, a fluid operated thrust member rigidly associated with the rotor and constituting in effect a piston coaxial with the rotor and disposed within a cylinder to form therewith a fluid pressure chamber the pressure in which tends to move the rotor assembly axially to reduce the axial clearance between one end face of the rotor and the adjacent end face of the working chamber, and a communicating fluid pressure passage between the fluid pressure chamber and a point in that clearance between an end face of the rotor and the adjacent end face of the working chamber the flow through which passage decreases with axial movement of the rotor under the action of pressure in the pressure chamber.

7. A rotary fluid pressure machine as claimed in claim 6 in which the rotor is provided with two similar fluid operated thrust members, the fluid pressure in the fluid pressure chambers of which tends to move the rotor in opposite directions, each fluid pressure chamber being connected by a fluid pressure passage to a point in the clearance space between the appropriate end of the rotor and the adjacent end of the working chamber.

8. A rotary fluid pressure machine as claimed in claim 6 in which the rotor carries two similar fluid operated thrust members the fluid pressure in the fluid pressure chambers of which tends to move the rotor respectively in opposite directions, the face of each thrust member on which the fluid pressure acts being directed toward the working chamber and each fluid pressure chamber being connected to a point in the clearance between the end face of the rotor and the working chamber remote from such fluid pressure chamber adjacent to a high pressure part of the working chamber.

9. A rotary fluid pressure machine as claimed in claim 6 in which the rotor carries two similar fluid pressure operated thrust members, the fluid pressure in the fluid pressure chambers of which tends to move the rotor respectively in opposite directions, the thrust face on which the fluid pressure acts being directed towards the working chamber and each pressure chamber being connected to a point in the clearance between the adjacent end of the rotor and working chamber adjacent to a high pressure part of the working chamber.

10. A gear wheel pump comprising a casing containing a working chamber and two pressure chambers disposed on opposite sides of said working chamber, intermeshing gear wheels disposed within the working chamber, each gear wheel having rigid therewith two thrust members constituting in effect pistons one face of each of which thrust member pistons is exposed to the pressure in the adjacent one of said pressure chambers so that the pressures in these chambers act in opposite directions upon the respective gear wheels, there being fluid delivery and leakage paths communicating with each pressure chamber the effective cross sectional area of one of which leakage paths remains substantially constant with axial movement of the gear wheel while the other of said leakage paths includes a throttling point constituted by a clearance between an end face of the gear wheel and the adjacent face of the casing, the effective cross section of the clearance thus varying with axial movement of the gear wheel.

GEORGE EDWARD CHITTENDEN.

REFERENCES CITED

The following references are of record in the file of this patent:

UNITED STATES PATENTS

| Number | Name | Date |
|---|---|---|
| 1,620,261 | Kennedy | Mar. 8, 1927 |
| 1,642,454 | Malmstrom | Sept. 13, 1927 |
| 1,673,259 | Meston et al. | June 12, 1928 |
| 2,236,980 | Ungar | Apr. 1, 1941 |
| 2,319,374 | Ungar | May 18, 1943 |
| 2,346,761 | Johnson | Apr. 18, 1944 |
| 2,391,072 | Pugh | Dec. 18, 1945 |
| 2,412,588 | Lauck | Dec. 17, 1946 |
| 2,420,622 | Roth et al. | May 13, 1947 |

FOREIGN PATENTS

| Number | Country | Date |
|---|---|---|
| 671,114 | France | Aug. 31, 1929 |